United States Patent [19]
Loughman et al.

[11] Patent Number: 6,111,033
[45] Date of Patent: Aug. 29, 2000

[54] ACIDIC POLYLACTIC POLYMERS

[75] Inventors: Thomas Ciaran Loughman; Ruth Mary Russell, both of Dublin, Ireland; Franck Jean-Claude Touraud, Vernon, France

[73] Assignee: Kinerton, Limited, Dublin, Ireland

[21] Appl. No.: 09/171,739

[22] PCT Filed: Apr. 22, 1997

[86] PCT No.: PCT/IE97/00031

§ 371 Date: Jan. 15, 1999

§ 102(e) Date: Jan. 15, 1999

[87] PCT Pub. No.: WO97/40085

PCT Pub. Date: Oct. 30, 1997

[30] Foreign Application Priority Data

Apr. 23, 1996 [IE] Ireland ..................................... 960307

[51] Int. Cl.[7] .............................. C08F 20/00; C08G 63/06
[52] U.S. Cl. ........................ 525/450; 528/272; 528/274; 528/296; 528/302; 528/308; 528/361; 525/437; 525/438; 525/444
[58] Field of Search ..................................... 528/272, 274, 528/296, 302, 308, 361; 525/437, 438, 444, 450

[56] References Cited

U.S. PATENT DOCUMENTS

| | | |
|---|---|---|
| 3,773,919 | 11/1973 | Boswell et al. . |
| 4,767,628 | 8/1988 | Hutchinson .............................. 424/426 |
| 5,084,553 | 1/1992 | Hess et al. .............................. 528/361 |
| 5,672,659 | 9/1997 | Shalaby et al. ........................ 525/54.1 |

FOREIGN PATENT DOCUMENTS

| | | |
|---|---|---|
| 0 107 591 A2 | 5/1984 | European Pat. Off. . |
| 0 426 055 A2 | 5/1991 | European Pat. Off. . |
| 0 426 055 A3 | 5/1991 | European Pat. Off. . |
| WO 94/15587 | 7/1994 | WIPO . |

OTHER PUBLICATIONS

"Drug Carriers in Biology and Medicine", G. Gregoriadis, Ed., 1979 Academic Press Inc. (London) Ltd., pp. 241–245.

*Primary Examiner*—Samuel A. Acquah
*Attorney, Agent, or Firm*—Brian R. Morrill; Fish and Richardson; John D. Conway

[57] ABSTRACT

A biodegradable polyester prepared from lactic acid, and, optionally, other hydroxy acid or acids. The polyester contains 4–100 carboxyl groups and has an average molecular weight of 1,000 to 200,000 g/mol. Also disclosed are methods of making such polyesters.

34 Claims, No Drawings

ACIDIC POLYLACTIC POLYMERS

This is a continuation of International Patent Application No. PCT/IE97/00031, with an international filing data of Apr. 22, 1997, now pending.

TECHNICAL FIELD

This invention relates to biodegradable polyesters and to methods for their preparation.

BACKGROUND ART

Biodegradable polymers have been used, for example, as excipients in sustained release compositions for drugs. See, e.g., U.S. Pat. Nos. 3,773,919 and 4,767,628. Examples of such polymers are copolymers of lactic acid and glycolic acid, which are made by either the polycondensation of lactic acid and glycolic acid, or by ring opening polymerization with lactide and glycolide. See, e.g., Drug Carriers in Biology and Medicine, ed. Gregoriadis, G., pages 241–245 (Academic Press, London 1979).

International Publication No. WO 94/15587 describes sustained release ionic conjugates of polymers and drugs. As the basic drug is ionically conjugated to the acidic polymer, increasing the acidity of the polymer is important to facilitate the formation of the conjugate.

DISCLOSURE OF INVENTION

An aspect of this invention features a biodegradable polyester comprising lactic acid units, wherein the polyester contains 4–100 (e.g., 4–40) carboxyl groups and has an average molecular weight of 1,000 to 200,000 g/mol. In one example, the polyester also includes glycolic acid units, or further includes a hydroxy-polycarboxylic acid unit (i.e., one or more units, such as tartaric acid, pamoic acid, or an ester acid thereof). The polyester can be made of 45 to 99.9 mole percent lactic acid units, 0 to 50 mole percent glycolic acid units, and 0.1 to 10 mole percent hydroxy-polycarboxylic acid units, in which the hydroxy-polycarboxylic acid contains 1 to 20 (e.g., 2–20) hydroxyl groups and 2 to 40 carboxyl groups (e.g., 2–20).

In another aspect, this invention features a method for preparing a biodegradable polyester or its derivative. The method includes reacting a polyhydroxy-polycarboxylic acid, such as tartaric acid, pamoic acid, or an ester acid, with lactic acid or lactide to produce a polyester, e.g., heating the reactant between 100° C. and 250° C. If desire, the polyhydroxy-polycarboxylic acid can also be concomitantly reacted with glycolic acid or glycolide. The method can further include esterifying hydroxyl groups in the polyester thus formed with a second polycarboxylic acid or a second anhydride or alkylated with a polyepoxy.

A third aspect of this invention features a method for preparing a biodegradable polyester derivative. The method includes reacting a polyol (e.g., glucose, sorbitol, lactose, mannitol, or gluconic acid) with lactic acid or lactide to produce a polyester (e.g., heating the reactant between 80° C. and 250° C.); and esterifying free hydroxyl groups of the polyester thus formed with a polycarboxylic acid (e.g., succinic acid) or an anhydride (e.g., succinic anhydride or 1,2,4,5-benzene tetracarboxylic dianhydride or glutaric anhydride optionally catalyzed with an acid, e.g., p-toluene sulfonic acid). If desired, polyol can be concomitantly reacted with glycolic acid or glycolide.

In a still another aspect, this invention features a method for preparing a biodegradable polyester. The method includes reacting a polyol with a polycarboxylic acid or an anhydride to produce a hydroxy-polycarboxylic acid, wherein the polyol has at least three hydroxy groups; and reacting the hydroxy-polycarboxylic acid thus formed with lactic acid or lactide to produce a polyester (e.g., heating the reactant between 80° C. and 250° C.). If desired, the method the hydroxy-polycarboxylic acid can be concomitantly reacted with glycolio acid or glycolide, and, optionally, the remaining hydroxyl groups in the polyester can be esterified with a second polycarboxylic acid (e.g., succinic acid) or a second anhydride (e.g., succinic anhydride or 1,2,4,5-benzene tetracarboxylic dianhydride) or alkylated with a polyepoxy (e.g., 1,2,7,8-diepoxyoctane). The second polycarboxylic acid or second anhydride may be incorporated at the end of the polyester chain (e.g., acid tipping) or the second polycarboxylic acid, second anhydride, or polyepoxy may be incorporated within the polyester (e.g., polycondensation).

A still another aspect of this invention features a method of coupling polyesters containing at least lactic acid units, with or without other units such as glycolic acid units. The method includes esterifying a free hydroxy group on each of the polyesters with a polycarboxylic acid (e.g., succinic acid) or an anhydride (e.g., succinic anhydride or 1,2,4,5-benzene tetracarboxylic dianhydride or giutaric anhydride optionally catalyzed with an acid, e.g., p-toluene sulfonic acid), or etherifying a free hydroxy group on the polyesters with a polyepoxy (e.g., 1,2,7,8-diepoxyoctane). In one embodiment, the free hydroxy group is esterified with succinic acid under reduced pressure. In another embodiment, the free hydroxy group is esterified with 1,2,4,5-benzene tetracarboxylic dianhydride.

A still another aspect of this invention features a method of increasing the free carboxyl groups of a biodegradable polyester as described above. The method includes esterifying the polyester with a polycarboxylic acid (e.g., succinic acid) or an anhydride (e.g., succinic anhydride or 1,2,4,5 benzene tetracarboxyl dianhydride) such that the polycarboxylic acid or anhydride cleaves an ester bond in the polyester and esterifies the resulting hydroxy group on the cleaved polyester.

As used herein, "hydroxy-polycarboxylic acid" contains at least one hydroxy group (e.g., between 1 and 20hydroxy groups) and at least two carboxyl groups (e.g., between 2 and 40 carboxyl groups); "polyhydroxy-polycarboxylic acid" contains at least two hydroxy groups (e.g., between 2 and 20 hydroxy groups) and at least two carboxyl groups (e.g., between 2 and 40 carboxyl groups); "polycarboxylic acid" contains at least two carboxyl groups, a polyepoxy contains at least two epoxy groups (e.g., two epoxy groups); and "polyol" contains at least two hydroxy groups (e.g., between 2 and 20 hydroxy groups). The term "anhydride" is meant to include both monoanhydride and polyanhydride.

Unless otherwise specified, lactic acid may be D-lactic acid or L-lactic acid and lactide may be D-lactide, L-lactide, or DL-lactide.

Other features and advantages of the present invention will be apparent from the detailed description of the invention, and from the claims.

It is believed that one skilled in the art can, based on the description herein, utilize the present invention to its fullest extent. The following specific embodiments are, therefore, to be construed as merely illustrative, and not limitative of the remainder of the disclosure in any way whatsoever.

Unless defined otherwise, all technical and scientific terms used herein have the same meaning as commonly understood by one of ordinary skill in the art to which this invention belongs. Also, all publications, patent applications, patents, and other references mentioned herein are incorporated by reference.

BEST MODES FOR CARRYING OUT THE INVENTION

EXAMPLE 1
Ring Opening Polymerization with L-Tartaric Acid

A 500 ml glass reactor was loaded with 203.2 g of L-lactide (Cilag AG, Schaffhausen, Switzerland), 81.8 g of glycolide (Cilag), and 15.0 g of L-tartaric acid (Riedel de Haen, Seelze, Germany). The L-Tartaric acid had been further dried over phosphorus pentoxide in an Abderhalden apparatus (Aldrich, Milwaukee, Wis., U.S.A.). 5.3 ml of a 0.1 M tin 2-ethyl-hexanoate solution in toluene was added (stoichiometric ratio of 200 ppm). After drying under vacuum at room temperature for one hour to remove the toluene, the reactor was placed under a nitrogen atmosphere and immersed in an oil bath preheated at 200° C. and kept at 200° C. for 4 hours under mechanical stirring. An amorphous copolymer was obtained comprising 65.13% lactic acid units, 32.56% glycolic acid units, and 2.31% tartaric units (65/33/2 PLGTA). The acid number of the copolymer was determined by titration to be 0.630 meq/g (e.g., acid number (milliequivalents/g)=the normality of NaOH multiplied by the volume of NaOH required to neutralize a gram of the polyester).

EXAMPLE 2
Polycondensation with Succinic Acid

A 500 ml glass reactor was loaded with 100.0 g of a 3,000 g/mol (65/33/2) PLGTA (acid number=0.630 meq/g) and 3.78 g of succinic acid (stoichiometric ratio of acid groups for succinic acid to hydroxyl group for copolymer=1.06). The reactor was immersed in an oil bath at 200° C. Once melted, the mixture was vigorously stirred and kept under vacuum to distill off the condensation water (0.10 mBar). Samples were removed and analyzed every half hour. After 4 hours, the reaction was stopped because of the significant increase in the viscosity of the copolymer. The monitoring of the polycondensation is shown in Table I. The evolution of the acid number and the average number molecular weight (AVG. Mn) were determined by gel permeation chromatography (GPC) in tetrahydrofuran (THF), using a Wyatt light scattering detector.

TABLE I

| REACTION TIME (hour) | ACID NUMBER (meq/g) | AVG. Mn (g/mol) |
|---|---|---|
| 0 | 1.207 | 4,100 |
| 0.5 | 0.862 | 6,000 |
| 1.0 | 0.729 | 8,100 |
| 1.5 | 0.668 | 7,700 |
| 2.0 | 0.604 | 10,300 |
| 2.5 | N/A | 13,800 |
| 3.0 | 0.557 | 17,600 |
| 4.0 | 0.486 | 19,500 |

EXAMPLE 3
Polycondensation with 1,2,4,5-Benzene Tetracarboxylic Dianhydride

A 500 ml glass reactor was loaded with 60.0 g of a (65/33/2) 10,000 g/mol PLGTA (acid number=0.341 meq/g) and 2.98 g of 1,2,4,5-benzene tetracarboxylic dianhydride (Aldrich Chemical Co., St. Louis, Mo.). The mixture was then immersed in an oil bath previously heated to 220° C. After complete melting, the mixture was stirred vigorously for 30 minutes. The average molecular weight was determined by sterile exclusion chromatography (SEC) to be 10,500. The acid number was determined to be 0.951 meq/g.

EXAMPLE 4
Polycondensation with 1,2,7,8-Diepoxy Octane 60.0 g of a (65/33/2) 10,000 g/mol PLGTA (Acid number=0.341 meq/g) was melted at 180° C. in a glass reactor. Using a Gilson pipette, 1.5 ml of 1,2,7,8-diepoxy octane was added dropwise by 300 microliter aliquots every 15 minutes. The mixture was stirred for four more hours at this temperature. Table II confirms both the increase in molecular weight of the copolymer and the lack of change of the acid number.

TABLE II

| REACTION TIME (hour) | ACID NUMBER (meq/g) | AVG. Mn (g/mol) |
|---|---|---|
| 0.0 | 0.34 | 14,190 |
| 1.0 | 0.37 | 14,130 |
| 2.0 | 0.37 | 16,440 |
| 3.0 | 0.38 | 17,160 |
| 4.0 | 0.39 | 17,760 |

EXAMPLE 5
Ring Opening Polymerization with Malic Acid

A 500 ml glass reactor was loaded with 209.1 g of L-lactide (Cilag), 84.2 g of glycolide (Cilag), 6.7 g of D,L-malic acid (Aldrich), and 4.45 ml of a 0.1 M solution of tin 2-ethyl-hexanoate in toluene. The same protocol as described in Example 1 was followed, except that the temperature of the oil bath was kept at 180° C. for the first four hours, and the temperature was then increased to 200° C. The polymerization was carried on over a total of 6 hours. The final copolymer contained only 1.7% by weight of residual L-lactide, had an acid number of 0.45 meq/g, and had an average molecular weight of 6,000 g/mol. The copolymer comprised 65.91% lactic acid units, 32.95% glycolic acid residues, and 1.14% malic acid residues. Its structure was linear with one hydroxy tip and two acid functions on the D,L-malic acid unit at the other tip.

EXAMPLE 6
Polycondensation with Succinic Acid

A mixture of 60.0 g of the copolymer of Example 5 and 0.82 g of succinic acid (Aldrich) was melted at 200° C., kept under reduced pressure, and vigorously stirred for 4.75 hours. The evolution of the acid number and average molecular weight of the polymer were both determined by GPC in THF using a Wyatt light scanning detector and is summarized in Table III.

TABLE III

| REACTION TIME (hour) | ACID NUMBER (meq/g) | AVG. Mn (g/mol) |
|---|---|---|
| 0.00 | 0.896 | 5,000 |
| 0.50 | 0.632 | 5,400 |
| 1.00 | 0.599 | 6,900 |
| 1.33 | 0.470 | 8,700 |
| 1.67 | 0.428 | 8,800 |
| 2.75 | 0.381 | 12,100 |
| 3.67 | 0.350 | 12,200 |
| 4.75 | 0.310 | 13,700 |

EXAMPLE 7
Synthesis of a Custom Initiator for Ring Opening Polymerization

A mixture of 22.61 g of L-Tartaric acid and 27.39 g of Benzene 1,2,4,5-tetracarboxylic dianhydride was added to a reaction vessel and immersed in an oil bath at 200° C. Once the mixture melted, the temperature of the vessel was raised to 220° C. over 40 minutes and kept at this temperature for 30 more minutes under vigorous stirring. After cooling to room temperature, the compound was characterized by acid titration to have an acid number of 12.96 meq/g.

EXAMPLE 8
Synthesis of a Custom Initiator for Ring Opening Polymerization

A solution of 13.50 g of L-Tartaric acid in 200 ml of acetone (previously dried over calcium chloride) was heated to reflux. 11.50 g of 1,2,7,8-diepoxy octane was added dropwise using an introduction funnel for over 30 minutes. The solution was then refluxed for 3 more hours. The oligomers were recovered by acetone evaporation and further dried under vacuum. The measured acid number was 4.03 meq/g.

EXAMPLE 9
Ring Opening Polymerization with a Custom Initiator

A 500 ml glass reactor was loaded with 203.2 g of glycolide, 81.8 g of L-lactide, and 14.9 g of the initiator of Example 7. The same protocol as described in Example 1 was followed except that the oil bath was kept at 220° C. and the polymerization was carried out over a total of 8 hours. The final copolymer had only 8.5% by weight of residual L-lactide, had an acid number of 0.77 meq/g, and had an average molecular weight of 12,900 g/mol.

EXAMPLE 10
Ring Opening Polymerization with a Custom Initiator

A 500 ml glass reactor was loaded with 129.4 g of glycolide, 52.1 g of L-lactide, and 18.5 g of the initiator of Example 8. The same protocol as described in Example 1 was followed except that the oil bath was kept at 200° C. and the polymerization was carried out over a total of 5 hours. The final copolymer had only 10.6% by weight of residual L-lactide, had an acid number of 0.472 meq/g, and had an average molecular weight of 30,500 g/mol.

EXAMPLE 11
Ring Opening Polymerization Using Polyols

A 500 ml glass reactor was loaded under dry atmosphere with glycolide, L-lactide, and various polyol initiators to obtain 300 g of a 66/33 PLGA copolymer of various molecular weights. The mixture was heated to a temperature generally 30° C. higher than the melting point of the polyol initiator used, and stirred for 4 to 8 hours depending on the polymerization kinetics. All the reaction conditions and the characteristics of the obtained copolymers are described in Table IV. Residual monomers (wt %) is the percent by weight of residual monomers (e.g., glycolide or lactide) in the polymer sample.

EXAMPLE 12

Acid Tipping with Succinic Anhydride

Each of copolymers synthesized in Example 11 were further reacted with succinic anhydride (excess of 1.5 times the amount of hydroxyl groups initially introduced in the synthesis mixture), at 150° C. for 30 minutes, and vigorously stirred. The modified copolymer was then dissolved in acetone. A 2 N sodium hydroxide aqueous solution was then added in an excess of twice the acid number of the copolymer. The copolymer was then precipitated from the solution by slow addition to cold deionized water. The suspension was finally spun down (5,000 rpm) at 0° C. for 30 minutes, and freeze-dried. This washing removed residual monomers from the polymerization, and converted excess of succinic anhydride to sodium succinate, which was also removed during the washing. The efficiency of the washing was verified by SEC. Table V summarizes the characteristics of these final copolymers.

TABLE V

| INITIATOR | ACID NUMBER (meq/g) | AVG. Mn (g/mol) |
| --- | --- | --- |
| D-Glucose | 0.331 | 15,100 |
| D-Lactose | 0.290 | 27,600 |
| D-Mannitol | 0.448 | 13,400 |
| Gluconic Acid | 0.549 | 11,000 |

EXAMPLE 13

Synthesis of a Custom Initiator for Ring Opening Polymerization

Different hydroxyl group containing initiators were acid functionalized using succinic anhydride, by melting both reagents and keeping them under vigorous stirring for 30 minutes. Reactor loadings and temperatures are summarized in Table VI.

TABLE IV

| INITIATOR TYPE | GLYCOLIDE (g) | L-LACTIDE (g) | INITIATOR (g) | TEMPERATURE/ REACTION TIME (° C.)/(Hrs) | AVG. Mn (g/mol) | RESIDUAL MONOMER RS (Wt %) |
| --- | --- | --- | --- | --- | --- | --- |
| D-Glucose | 210.8 | 84.9 | 4.3 | 180/8 | 13,400 | 4.7 |
| D-Lactose | 210.2 | 84.7 | 5.1 | 200/8 | 24,200 | 4.5 |
| D-Mannitol | 211.3 | 85.1 | 3.6 | 180/4 | 10,900 | 2.9 |
| Gluconic Acid | 210.8 | 84.8 | 4.4 | 200/8 | 12,400 | 4.7 |

TABLE VI

| INITIATOR | INITIATOR WEIGHT (g) | SUCCINIC ANHYDRIDE (g) | TEMPERATURE /REACTION TIME (° C.)/(min) | ACID NUMBER (meq/g) | MELTING POINT (° C.) |
|---|---|---|---|---|---|
| D-Glucose | 7.8 | 17.2 | 160/30 | 8.2 | 150 |
| D-Lactose | 9.1 | 15.9 | 200/20 | 6.5 | 220 |
| D-Mannitol | 7.8 | 17.2 | 150/30 | 8.2 | 120 |

EXAMPLE 14
Ring Opening Polymerization with a Custom Initiator

A 500 ml glass reactor was loaded under dry atmosphere with Glycolide, L-lactide, and the three modified initiators of Example 13 to obtain 200 g of a copolymer of various molecular weight. The mixture was heated to a temperature generally 30° C. higher than the melting point of the polyol initiator used, and stirred for 4 to 8 hours depending on the polymerization kinetics. All the reaction conditions and the characteristics of the obtained copolymers are described in Table VII.

TABLE IX

| Hexadecanol | 1,2-Propanediol | BTCDA (g) | Acid Number | AVG. Mn (g/mol) | RESIDUAL MONOMERS |
|---|---|---|---|---|---|
| 0 | 71.12 | 3.88 | 0.825 | 17,300 | 4.3/1.7 |
| 7.20 | 64.81 | 2.98 | 0.545 | 10,000 | 1.8/1.4 |

TABLE VII

| MODIFIED INITIATOR TYPES | GLYCOLIDE (g) | L-LACTIDE (g) | INITIATOR (g) | TEMP (° C.) | REACTION TIME (Hrs) | AVG. Mn (g/mol) | RESIDUAL MONOMERS (Wt %) | ACID NUMRER (meq/g) |
|---|---|---|---|---|---|---|---|---|
| Succinylated D-Glucose | 134.3 | 54.1 | 11.6 | 180 | 8 | 18,900 | 3.5 | 0.678 |
| Succinylated D-Lactose | 133.6 | 53.8 | 12.6 | 220 | 8 | 22,600 | 2.2 | 0.780 |
| Succinylated D-Mannitol | 134.3 | 54.I | 11.7 | 180 | 7 | 5,300 | 3.5 | 0.648 |

EXAMPLE 15
Ring Opening Polymerization Using Hexadecanol and 1,2-Propanediol

Two copolymers were synthesized as described in Example 11 using hexadecanol or 1,2-propanediol as the polyol initiator. The reaction conditions and results are shown in Table VIII.

EXAMPLE 17
Synthesis of a Custom Initiator

A 500 ml glass reactor was loaded with 36.13 g of 1,2,4,5-benzene tetracarboxylic dianhydride (BTCDA) and 13.87 g of 1,2-propanediol to obtain a decamer of 1,2-propylene-benzene dicarboxylic acid dicarboxylate terminated at both ends by a 1,2-propanediol unit. The mixture

TABLE VIII

| INITIATOR TYPE | GLYCOLIDE (g) | L-LACTIDE (g) | INITIATOR (g) | TEMP. REACTION TIME | AVG. Mn (g/mol) | RESIDUAL MONOMER (Wt %) |
|---|---|---|---|---|---|---|
| Hexadecanol | 203.5 | 81.9 | 14.55 | 180/4 | 5,000 | 1.8 |
| 1,2-propanediol | 210.6 | 84.8 | 4.6 | 180/4 | 5,100 | 2.1 |

EXAMPLE 16

Polycondensation with BTCDA

Either the two copolymers of Example 15 or just the 1,2-propanediol polymer of Example 15 were mixed in a 500 ml glass reactor with benzene 1,2,4,5-tetracarboxylic dianhydride (BTCDA). The copolymer initiated by the hexadecanol contained only one hydroxyl group and, thus, acted as a chain limitator for the polycondensation. In both experiments, the reaction mixture was stirred at 200° C. for 4 hours.

was left at room temperature under mechanical stirring for 30 minutes to gently initiate the polycondensation. The mixture was then immersed in an oil bath at 160° C. until the mixture was fully melted. The temperature was then brought up to and kept at 180° C. for 20 minutes when the viscosity of the mixture became too high to allow stirring. The mixture was then cooled down to room temperature and analyzed by SEC in acetone and acid function titration. The resulting polymer had an acid number of 6.2 meq/g, an average Mn of 3020 g/mol, and a melting point of 240° C.

EXAMPLE 18
Ring Opening Polymerization with a Custom Initiator

A 500 ml glass reactor was loaded with 131.8 g of glycolide, 53.1 g of L-lactide, and 15.1 g of the initiator of Example 17. The mixture was then heated to 220° C. and stirred for 5.5 hrs. The final copolymer had only 8.7%, by weight, of residual L-lactide, an acid number of 0.77 meq/g, and an average number molecular weight of 15,200 g/mol.

EXAMPLE 19
Ring Opening Polymerization with Glycolic Acid

A 500 ml glass reactor was loaded with a mixture of glycolide, L-lactide, and the ring opening polymerization initiator glycolic acid under dry atmosphere. A 0.1 M toluene solution of tin2-ethyl-hexanoate was used as a catalyst in a molar ratio of 200 ppm. The mixture was further dried under vacuum for one hour to remove the toluene and then immersed in an oil bath. The polymerization was carried on under vigorous stirring for 6 hours. The reaction conditions and characteristics of the final copolymer are listed in Table X.

TABLE X

| INITIATOR TYPE | GLYCOLIDE (g) | L-LACTIDE (g) | INITIATOR (g) | TEMPERATURE/ REACTION TIME (° C.)/(Hrs) | AVG. Mn (g/mol) | RESIDUAL MONOMER (Wt %) | ACID NUMBER (meq/g) |
|---|---|---|---|---|---|---|---|
| Glycolic acid | 213.1 | 85.8 | 2.3 | 200/6 | 12,500 | 1.8 | 0.129 |

EXAMPLE 20
Polycondensation with Succinic Acid or HCACH

The copolymer of Example 19 was mixed with succinic acid or hexacarboxylic acid cyclohexane (HCACH) at a respective stoichiometric ratio of 1:1 and 3:2, melted at 200° C., and kept under stirring for 2 to 4 hours until the SEC analysis failed to show any elution peak for succinic acid or HCACH. Conditions and characteristics are summarized in Table XI.

TABLE XI

| INITIATOR | ACID NUMBER (meq/g) | AVG. Mn (g/mol) |
|---|---|---|
| Succinic Acid | 0.097 | 35,500 |
| HCACH | 0.630 | 6,800 |

It is to be understood that while the invention has been described in conjunction with the detailed description thereof, that the foregoing description is intended to illustrate and not limit the scope of the invention, which is defined by the scope of the appended claims. Other aspects, advantages, and modifications are within the claims.

EXAMPLE 21
Synthesis of a 12,000 g/mol 66/33/1 PLGTA Copolymer Initiated by Tartaric Acid Reactor was loaded with monomers glycolide (Purac Biochem, Netherlands; 84.72 g), lactide (Purac Biochem; 210.41 g), and L(+)-tartaric acid (Riedel-de Haen, 3.74 g) and stannous 2-ethyl hexanoate (Sigma, St. Louis, Mo., USA, article number S-3252) in toluene (Riedel-de Haen) solution (0.1043 M, 4.25 ml). The L(+)-tartaric acid was previously dried over silica gel in an Abderhalden drying apparatus for 9 hours. The reactor (connected to pump via a liquid nitrogen trap) was then put under vacuum (0.04 mbar) with stirring (34 rpm, Bioblock Scientific stirrer, Strasbourg, France, Model 94412) for approximately 40 minutes to remove toluene. The reactor was then placed in oil bath (Temperature=40° C.) for 30 minutes. The reactor, under an atmosphere of oxygen free nitrogen (BOC gases, moisture content of 8VPM), was then immersed in oil bath (Temperature=200° C.) and stirring was increased to ~125 rpm. Prior to immersion, a heating tape was placed on lid (Thermolyne type 45500 input control, setting –4). The time taken to completely melt contents of reactor was noted, typically 10 minutes for a reactor load of 300 g at 200° C. Samples were taken during reaction every 2 hours for example and analyzed by GPC to determine the percentage residual monomer and to obtain values for average molecular weight (Mn) and average molecular weight (Mw). Typical reaction times are of the order of 8 hours.

An amorphous copolymer was obtained comprising 66.29% lactide units, 33.15% glycolide units, and 0.56% tartaric acid units (66/33/1 PLGTA). The acid number of the titration was determined to be 0.267 meq/g. The average number average molecular weight of the copolymer had a value of 12,360, the average weight molecular of the copolymer was 14,060 giving a Mw/Mn value of 1.37.

EXAMPLE 22
Acid Tipping 12,000 g/mol 66/33/1 PLGTA by Glutaric Anhydride

Reactor was loaded with the above PLGTA copolymer (19.01 g) and glutaric anhydride (Aldrich, 0.47 g). The loaded reactor was purged until pressure reading was approximately 0.04 mbar. The reactor was subsequently put under an atmosphere of oxygen free nitrogen (BOC Gases, moisture content of 8VPM) and immersed in oil bath (Temperature=160° C.) with heating tape on lid (setting=4, same model as before) at a convenient and noted time. The contents of reactor melted after 10 minutes with this reactor load at 160° C. Reaction was carried out for a further 30 minutes. Final acid number of the glutarylated PLGTA was 0.353 meq/g. Mn, Mw and Mw/Mn values were found to be, respectively, 11,850, 12,500, and 1.055. The percentage of PLGTA hydroxyl groups which were glutarylated was 69.7%.

What is claimed is:

1. A biodegradable polyester comprising lactic acid units, glycolic acid units and at least one hydroxy-polycarboxylic acid unit selected from the group consisting of tartaric acid, pamoic acid, tartaric acid ester, and pamoic acid ester.

2. A biodegradable polyester according to claim 1, wherein said polyester substantially comprises 65 mole percent lactic acid units, 33 mole percent glycolic acid units, and 2 mole percent tartaric acid units.

3. A biodegradable polyester according to claim 1, wherein said hydroxy-polycarboxylic acid contains between 2 to 20 hydroxyl groups and 2 to 20 carboxyl groups.

4. A biodegradable polyester comprising lactic acid units, glycolic acid units, and a custom initiator.

5. A biodegradable polyester according to claim 4, wherein said custom initiator comprises tartaric acid units and 1,2,4,5-benzene tetracarboxylic acid units.

6. A biodegradable polyester according to claim 4, wherein said custom initiator comprises acid units and 1,2,7,8-diepoxy octane units.

7. A biodegradable polyester according to claim 4, wherein said custom initiator comprises succinic acid units and polyol units, wherein said polyol is selected from the group consisting or glucose, lactose, and mannitol.

8. A biodegradable polyester comprising lactic acid units, glycolic acid units, and an initiator, wherein said initiator comprises hexadecanol.

9. A biodegradable polyester comprising lactic acid units, glycolic acid units, and an initiator, wherein said initiator comprises 1,2-propanediol.

10. A biodegradable polyester of claim 9, further comprising 1,2,4,5-benzene tetracarboxylic acid units.

11. A biodegradable polyester of claim 10, further comprising hexadecanol units.

12. A custom initiator for polymerization comprising 1,2,4,5-benzene tetracarboxylic acid units and 1,2-propanediol units.

13. A biodegradable polyester comprising lactic acid units, glycolic acid units, and either hexacarboxylic acid cyclohexane units or a custom initiator, wherein said custom initiator comprises 1,2,3,5-benzene tetracarboxylic acid units and 1,2-propanediol units.

14. A biodegradable polyester comprising lactic acid units, glycolic acid units, and tartaric acid units, wherein said polyester is acylated with glutaric anhydride.

15. A method for preparing a biodegradable polyester or its derivative, said method comprising reacting polyhydroxy-polycarboxylic acid with lactic acid or lactide and glycolic acid or glycolide to produce a polyester, wherein said polyhydroxy-polycarboxylic acid is selected from the group consisting of tartaric acid, pamoic acid, tartaric acid ester, and pamoic acid ester.

16. A method according to claim 15, further comprising esterifying hydroxyl groups in said polyester thus formed with a second polycarboxylic acid or an anhydride or alkylated with a polyepoxy.

17. A method according to claim 16, wherein said method comprises esterifying hydroxy groups in said polyester with glutaric anhydride and an acid catalyst.

18. A method for preparing a biodegradable polyester derivative, said method comprising:
reacting a polyol with lactic acid or lactide to produce a polyester; and
esterifying free hydroxyl groups of said polyester thus formed with a polycarboxylic acid or an anhydride.

19. A method according to claim 18, wherein said polyol is also reacted with glycolic acid or glycolide.

20. A method according to claim 18, wherein said polyol is glucose, sorbitol, lactose, mannitol or gluconic acid.

21. A method according to claim 18, wherein said polycarboxylic acid is succinic acid and said anhydride is succinic anhydride or 1,2,4,5-benzene tetracarboxylic dianhydride.

22. A method for preparing a biodegradable polyester, said method comprising:
reacting a polyol with a polycarboxylic acid or an anhydride to produce a hydroxy-polycarboxylic acid, wherein said polyol has at least three hydroxy groups; and
reacting said hydroxy-polycarboxylic acid thus formed with lactic acid or lactide to produce a polyester.

23. A method according to claim 22 wherein said hydroxy-polycarboxylic acid is also reacted with glycolic acid or glycolide.

24. A method according to claim 22, wherein said polyol is glucose, sorbitol, lactose, mannitol, or gluconic acid.

25. A method according to claim 22, wherein hydroxyl groups in said polyester are esterified with a second polycarboxylic acid or a second anhydride or alkylated with a second polyepoxy.

26. A method according to claim 25, wherein said polycarboxylic acid is succinic acid and said second anhydride is succinic anhydride or 1,2,4,5-benzene tetracarboxylic dianhydride or said second polyepoxy is 1,2,7,8-diepoxyoctane.

27. A method of coupling polyesters containing lactic acid units, said method comprising esterifying a free hydroxy group on each of said polyesters with a polycarboxylic acid or an anhydride or etherifying a free hydroxy group on said polyesters with a polyepoxy.

28. A method according to claim 27, wherein said polycarboxylic acid is succinic acid, said anhydride is succinic anhydride or 1,2,4,5-benzene tetracarboxylic dianhydride, and said polypoxy is 1,2,7,8-diepoxyoctane.

29. A method according to claim 27, wherein said free hydroxy group is esterified with succinic acid under reduced pressure.

30. A method according to claim 27, wherein said polyester further contains glycolic acid units.

31. A method according to claim 27, wherein said free hydroxy group is esterified with 1,2,4,5-benzene tetracarboxylic dianhydride.

32. A method of increasing the free carboxylic groups of a biodegradable polyester containing lactic acid units, said method comprising esterifying said polyester with a polycarboxylic acid or an anhydride such that said polycarboxylic acid or anhydride cleaves an ester bond in said polyester and esterifies the resulting hydroxy group on said cleaved polyester.

33. A method according to claim 32, wherein said polyester further contains glycolic acid units.

34. A method according to claim 32, wherein said polycarboxylic acid is succinic acid and said anhydride is succinic anhydride or 1,2,4,5 benzene tetracarboxyl dianhydride.

* * * * *

UNITED STATES PATENT AND TRADEMARK OFFICE
CERTIFICATE OF CORRECTION

| | |
|---|---|
| PATENT NO. | : 6,111,033 |
| DATED | : August 29, 2000 |
| INVENTOR(S) | : Thomas Ciaran Loughman, Ruth Mary Russell and Franck Jean-Claude Touraud |

It is certified that error appears in the above-identified patent and that said Letters Patent is hereby corrected as shown below:

Column 10,
Line 59, "comprises acid" should read -- comprises tartaric acid --.

Signed and Sealed this

First Day of November, 2005

JON W. DUDAS
*Director of the United States Patent and Trademark Office*